United States Patent [19]

Al-Salameth et al.

[11] Patent Number: 5,040,111

[45] Date of Patent: Aug. 13, 1991

[54] PERSONAL COMPUTER BASED NON-INTERACTIVE MONITORING OF COMMUNICATION LINKS

[75] Inventors: Daniel Y. Al-Salameth, Marlboro; Jeffrey J. Farah, Newark; John Soukas, Freehold, all of N.J.

[73] Assignee: AT&T Bell Laboratories, Murray Hill, N.J.

[21] Appl. No.: 179,692

[22] Filed: Apr. 11, 1988

[51] Int. Cl.⁵ .................. G06F 11/30; G06F 11/32; G06F 11/34

[52] U.S. Cl. .................. 364/200; 364/238.5; 364/286.2; 364/264.2; 364/267.2; 364/267.4; 364/929; 364/948.21; 364/949.1; 364/949.3; 364/481

[58] Field of Search ... 364/200 MS File, 900 MS File, 364/481

[56] References Cited

U.S. PATENT DOCUMENTS

| B 541,496 | 1/1976 | Etra | 340/172.5 |
| 4,241,416 | 12/1980 | Tarczy-Hornoch | 364/900 |
| 4,400,783 | 8/1983 | Locke | 364/483 |
| 4,403,303 | 9/1983 | Howes | 364/900 |
| 4,545,011 | 10/1985 | Lyon | 364/200 |
| 4,618,196 | 10/1986 | Muzslay | 3334/17 C |
| 4,810,958 | 3/1989 | Mogi | 324/73 R |

Primary Examiner—Gareth D. Shaw
Assistant Examiner—Paul Wayher
Attorney, Agent, or Firm—Eli Weiss

[57] ABSTRACT

The present invention utilizes hardware and/or software, in combination with a personal computer and its peripheral devices (i.e., storage media, peripheral control, video display and the like) to monitor communication links. The personal computer, to operate properly, must operate in an interactive communication mode. But, to avoid "lock-up" of a communication link which is being monitored, the personal computer must be "invisible" to equipment on the communication link. Hardware is disclosed which permits the personal computer to operate in its interactive communications mode while being "invisible" (non-interactive) to equipment on a communication link being monitored.

1 Claim, 7 Drawing Sheets

FIG.8

| | |
|---|---|
| 36 | |
| READ INPUT X | 722 |
| INITIALIZE STATE X | 724 |
| FROM M X | 726 |
| READ INPUT Y | 728 |
| CHECK VALIDITY INPUT | 732 |
| BRANCH ON INVALID | 734 |
| STORE DATA VALUE | 736 |
| RETURN INPU Y AND RESTART | 738 |
| CHECK FOR END SEG. | 742 |
| BRANCH ON NO READ INPUT | 744 |
| CLOSE ALL OPEN FILES | 746 |
| END | 748 |
| BAUD | 750 |
| PARITY | 760 |
| DATA | 770 |
| STOP | 780 |
| LOG FILE | 790 |
| INTERMEDIATE STORAGE | 792 |
| TIME STAMP | 794 |
| STORAGE UNIT | 740 |

PERSONAL COMPUTER BASED NON-INTERACTIVE MONITORING OF COMMUNICATION LINKS

BACKGROUND OF THE INVENTION

Technical Field

The present invention relates to the monitoring of communication links to analyze and verify the performance of a system.

BRIEF DESCRIPTION OF THE DRAWING

When integrating, testing, monitoring and/or trouble shooting digital transmission systems, it is necessary to obtain large amounts of data which must then be assembled, configured, re-configured, and examined. The system can range from a new computer peripheral, which may be coupled to a mainframe or to a personal computer, to a network which may contain many different computers, switches, sequencers, peripherals and the like. Clearly, all of the various units must be compatible with each other if they are to function in an integrated environment.

During the testing of equipment in an integrated network, the need of a data monitor/manipulator is normally required. At times, the only monitoring device available for use may be a protocal analyzer. Although a protocol analyzer is capable of capturing data, it is not capable of off line manipulation of the data which has been captured, nor can the protocol analyzer capture and store sufficient amounts of data in real time for off line testing and/or analysis purposes. Additionally, the data captured by the protocol analyzer can not be time-tagged. These deficiencies of the protocol analyzer adversely impacts on the ability to determine the throughput, loading and degradation of the equipment under test.

SUMMARY OF THE INVENTION

The lack of functionality exhibited by the protocol analyzer presently available is avoided by this invention.

The natural choice for large data storage, file manipulation, portability and ease of operation and implementation is the personal computer. However, prior to our invention, the use of the personal computer proved futile for monitoring a communication link and capturing all data being transmitted because the communications protocols normally used require interactive communication between the personal computer and end-users. The problem is that interactive communication between a personal computer and the end-users causes the end-users' systems to "lock-up" thus rendering the entire communication path unusable.

Prior to our invention, attempts with software alone to force the personal computer to operate in its interactive mode while being invisible to the end-users have not been successful. In addition, the personal computer must be invisible during the integration testing of a device in a "field environment" to preclude the possibility of either enhancing or degrading the operation of a system.

Thus, the personal computer must not only be non-interactive with the end-users' communication line (to prevent lock-up) but to perform its various functions, the personal computer must operate as if it is actually involved in interactive communication.

The above noted problems are solved by hardware which enables a personal computer to perform the functions of a protocol analyzer and, when combined with software, perform the functions of data storage, time-tagging of data, manipulation of data and the like. Additionally, the apparatus is portable, efficient in its operation and not expensive to purchase and operate.

DETAILED DESCRIPTION

Figure 1:
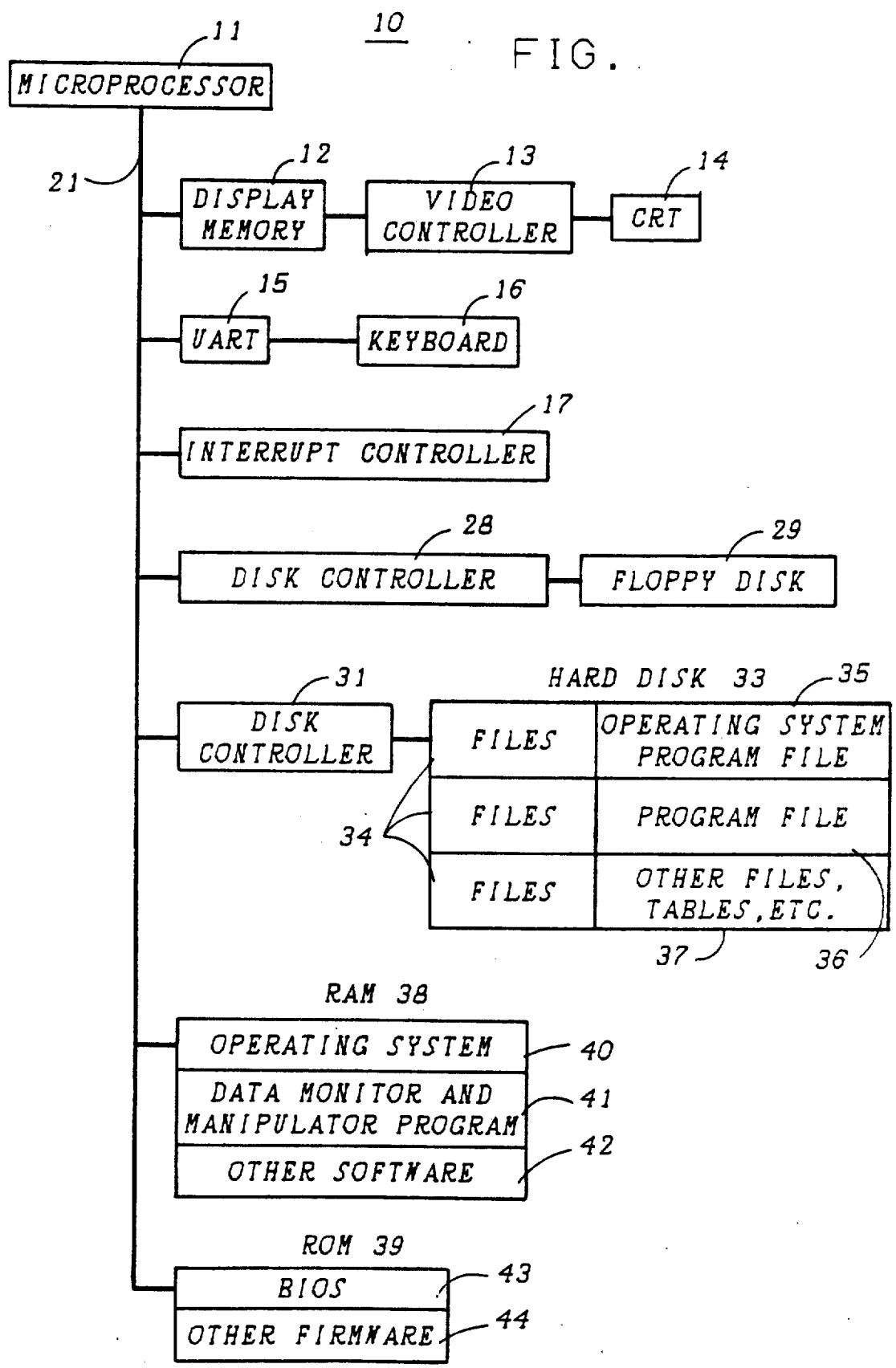
Figure 2:
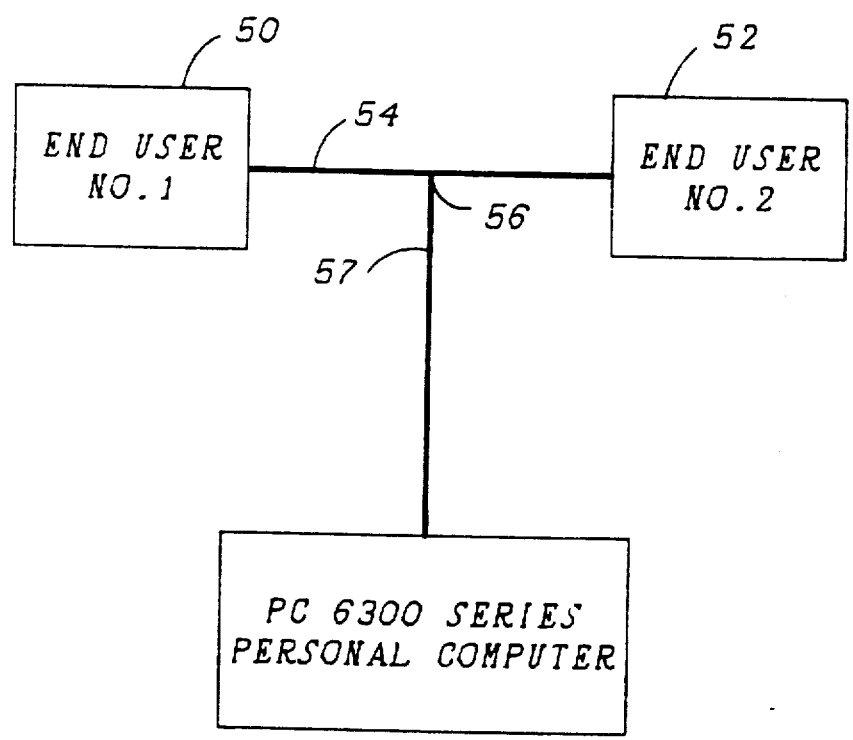
Figure 3:
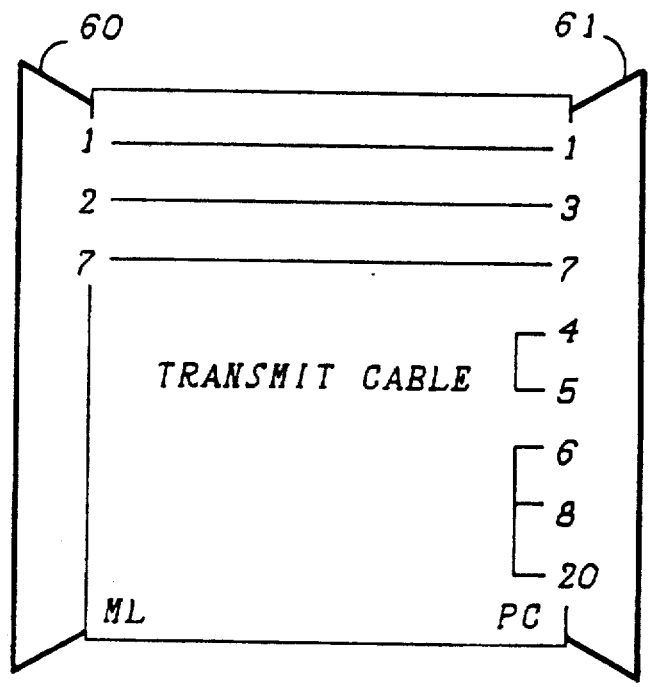
Figure 4:
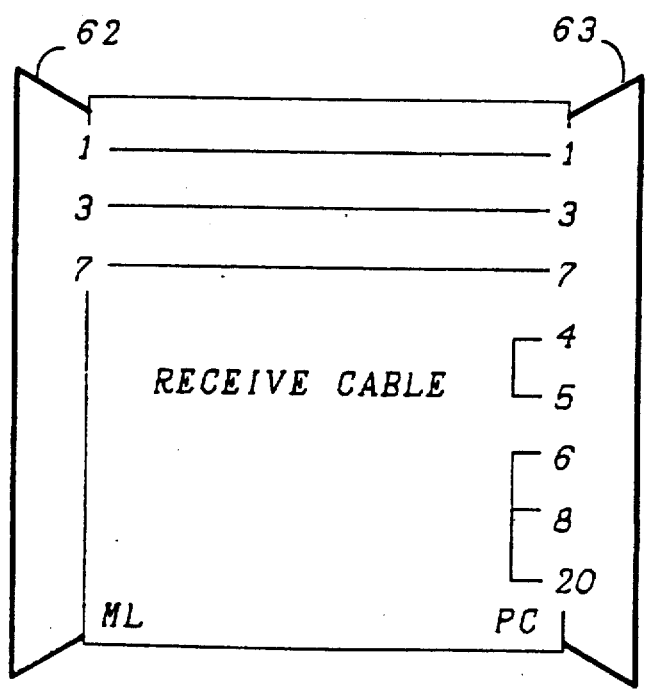
Figure 5:
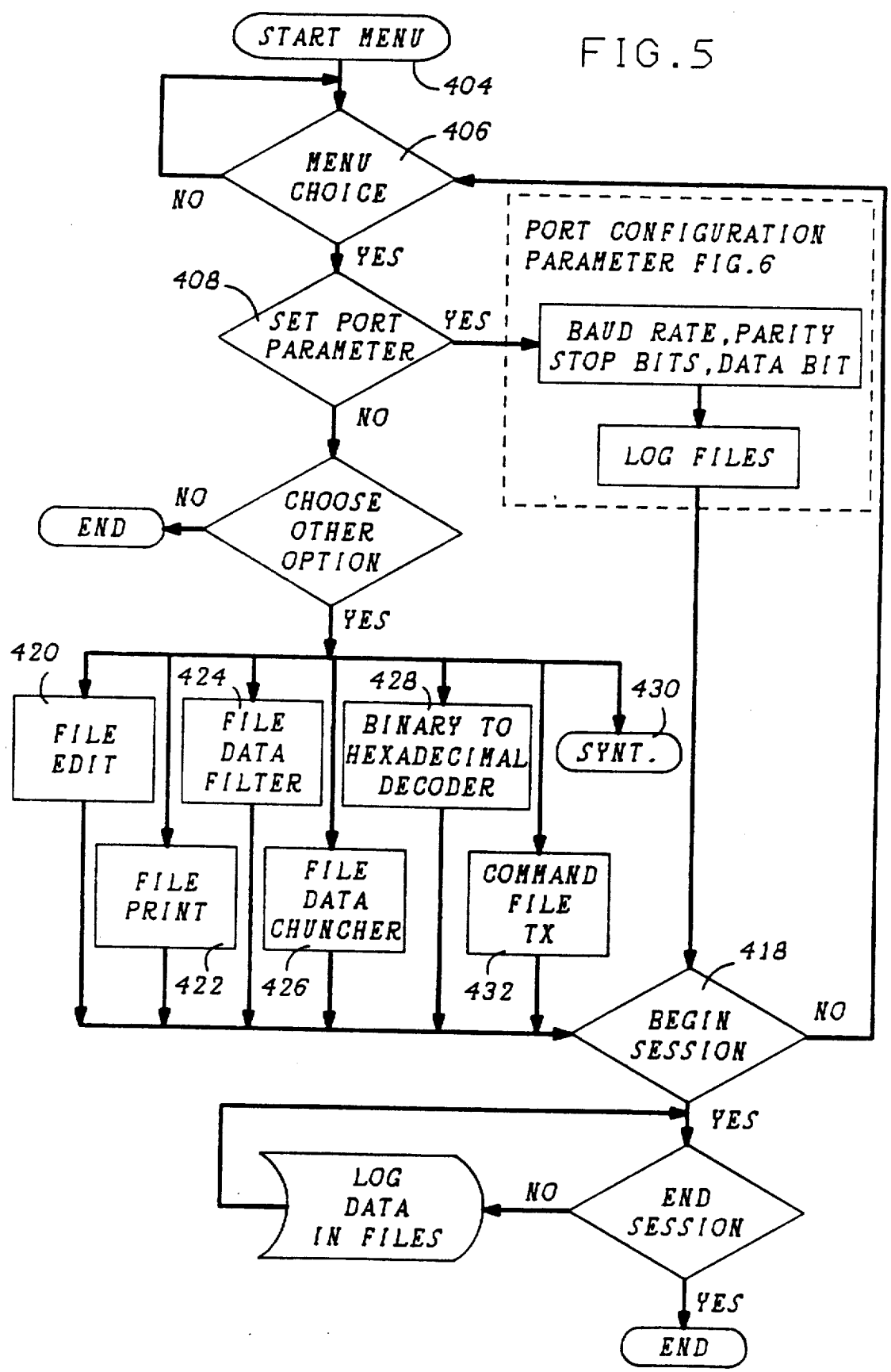
Figure 6:
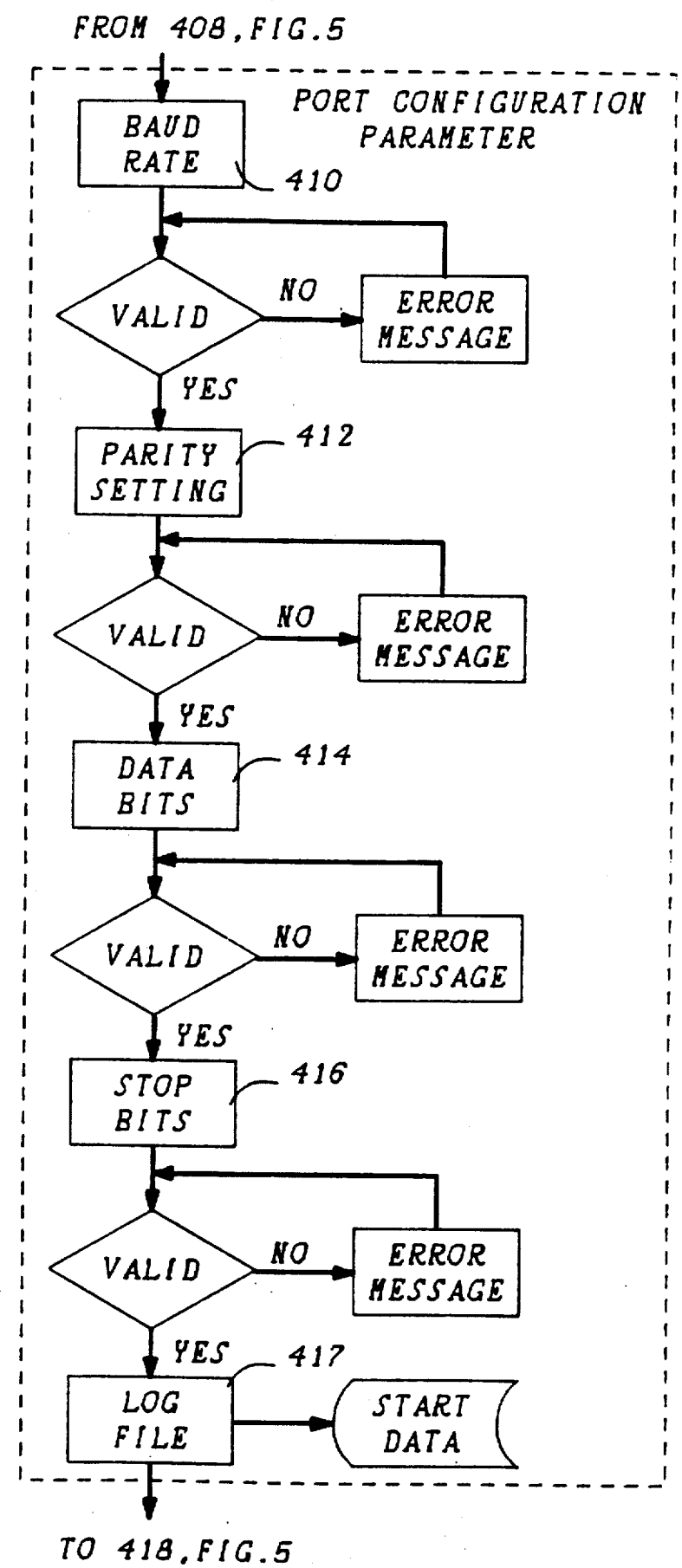
Figure 7:
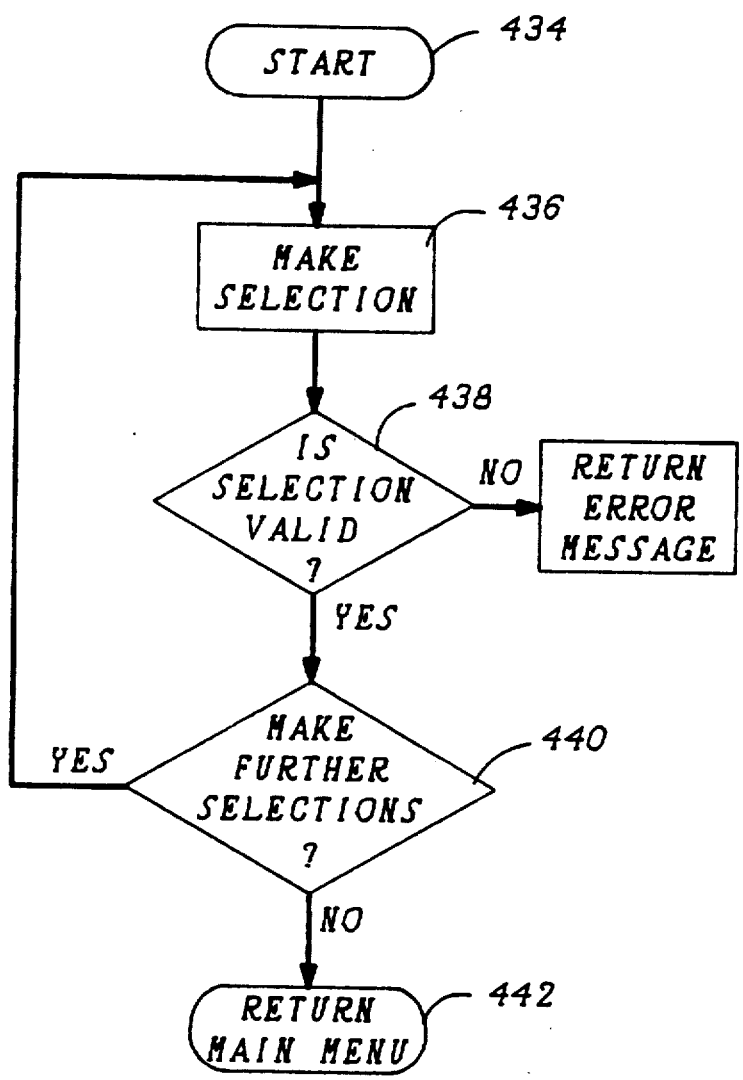

A more complete understanding of the invention can be obtained by reading the following description of a specific illustrative embodiment of the invention in conjunction with the appended drawing in which;

FIG. 1 is a block diagram of a microcomputer system embodying the principles of the present invention;

FIG. 2 is a block diagram of a personal computer connected to monitor information transmitted between two end users in accordance with the principles of the present invention;

FIGS. 3 and 4 are diagrams of the transmitting and receiving connect cables which connect the personal computer to the line being monitored;

FIGS. 5, 6 and 7 are flow charts of the processing performed by software within the system of FIG. 1; and FIG. 8 is a memory map of a region of the hard disk used in the system of FIG. 1.

The system 10 of FIG. 1 is based around a standard microcomputer. The system is illustratively based on an AT&T Model PC6300 personal computer, at the heart of which is a microprocessor 11 having address, data and control buses denoted generically as bus 21. Connected to bus 21 are a display memory 12, whose contents are used by a video controller 13 to generate video signals for a CRT 14; a universal asynchronous receiver transmitter (UART) 15, which serves as a serial interface between microprocessor 11 and a keyboard 16; an interrupt controller 17, to which hardware interrupt leads (not shown) extend, inter alia, from UART 15; a floppy disk controller 28, which serves as an interface between microprocessor 11 and a floppy disk memory 29, and a hard disk controller 31, which serves as an interface between microprocessor 11 and hard disk memory 33. The latter contains inter alia, text files 34; a copy of the workstation's operating system 35—illustratively the MS-DOS ® operating system; a copy of an application module 36, herein referred to as "program file" which, when executing, performs the various functions and controls the system hardware in accordance with the principles of the invention; and a number of other files not here relevant indicated at 37.

Also connected to bus 21 is random access memory (RAM)38 and read-only memory (ROM)39. When the system is in operation, RAM38 holds the executed copies of a) the operating system, indicated as 40, and b) data monitor and manipulator program, indicated at 41, and c) other software not here relevant, indicated as 42. ROM39 contains the conventional Basic Input/Output System (BIOS)43 as well as other firmware 44.

The present invention utilizes hardware and/or software in combination with a personal computer and its peripheral devices (i.e., storage media, peripheral control, video display and the like). Two modes of operation can be selected. The first mode of operation is where the personal computer is an end-user and there is interactive communications. The second mode of operation is as a line monitor which is invisible to (non-interactive with) the system end-users.

The first mode of operation is accomplished with software which enables the user to configure either single or multiple communication ports. The configuration process can include Baud Rate, Parity, Data Bits, Stop Bits and a Log File for recording all transactions. In addition, the user can perform interactive communication via the terminal keyboard, or call upon a script/-command file to execute a series of commands. The software can effect file editing access, printing access, data filtering, data crunching and data decoding configured by the user, to differentiate between "good data" which should be retained and "undesired data" which should be discarded. Additionally, if desired, the incoming data can be dynamically time tagged for subsequent analysis.

The second mode of operation (where the end-users and equipment is completely unaware of the presence of the line monitor) uses the two connect cables of FIGS. 3 and 4. The connect cable of FIG. 3 is the transmit connect cable; and, the connect cable of FIG. 4 is the receive connect cable. The connect cables of FIGS. 3 and 4 provide the personal computer with the invisibility which is required to prevent interference with end-user communications and, at the same time, conditions the personal computer to operate in its interactive mode.

The transmit connect cables enable the personal computer to receive data transmitted by the host, and the receive connect cable enables the personal computer to transmit data to the host. This flexibility permits the personal computer to quickly disregard unwanted information.

The personal computer, to operate properly, must operate in an interactive communication mode. The connectors of FIGS. 3 and 4 condition the personal computer to operate as if it is in an interactive communication mode when, in fact, it is actually operating in a non-interactive communication mode with the overall system.

Referring now to FIG. 2, there is illustrated a typical system for monitoring a communication link which can comprise a first end user 50 connected to a second end user 52 via a cable 54. Interposed between the two end users is a standard DB25 Y-cable connector 56. A connect cable 57 is connected, at one end to the line that is to be monitored via the Y-cable connector 56 and at the other end to the personal computer which must appear to be invisible to the end users 50, 52. Software conditions the personal computer to monitor communications which are exchanged between end user 50 and end user 52 through the monitored link 54. Specifically, the connect cables are hardwired to condition the personal computer to accept data, but not to send acknowledgements of any kind to the data originator.

Referring to FIG. 3, the connect cable 57 consists of two separate cables, the first being a transmitting connect cable and the second being a receiving connect cable. Each cable contains two connectors, one at each end. The transmitting cable contains connectors 60, 61. Connector 60 is adapted to be connected to Y-cable connector 56 in cable 54; and connector 61 is connected to the personal computer. Pin number 1 of connector 60 is connected to pin number 1 of connector 61. Pin number 2 of connector 60 is connected to pin number 3 of connector 61. Pin number 7 of connector 60 is connected to pin number 7 of connector 61. Pins 4 and 5 of connector 61 are connected together; and pins 6, 8 and 20 of connector 61 are connected together.

The receiving cable is hard wired exactly as the transmitting cable is hard wired except that the pin number 3 of connector 63 which mates with the personal computer is connected to pin number 3 of connector 62 which mates with the Y connector 56.

A signal measurement apparatus in accordance with the present invention can be implemented by appropriately programming a personal computer with software written in a high level language such as GWBASIC and the 'C' programming language, for use on the personal computer designated PC6300 by American Telephone and Telegraph Company—or any IBM PC compatable MS-DOS personal computer.

The flowchart of FIG. 5 is illustrative of the process performed to effect the monitoring of the communication links desired. The process is initiated at 404 by entering the program and then proceeds to 406 to present to the user the options which are available.

Options which can be included are A) Port Configuration Parameters; B) File Editing; C) File Printing; D) File Data Filter; E) File Data Cruncher; F) Binary to Hexodecimal Decoder; G) File Syntax Checker; H) Command File Transmitter and the like.

The choice of any one of the options presents to the user a sub-menu from which the actual values required for each function are obtained.

Upon selecting the option of setting the parameters of the port, the program advances to 408 which enables the user to select the major parameters available.

The user is prompted, in a step by step fashion in the selection of the Port Configuration Parameters. At each step, a specific value is inserted. If the value inserted is a valid number (i.e. an acceptable parameter value), the user is permitted to continue to the next parameter. If the value inserted is not valid (i.e., not an acceptable choice), the user is made aware of this fact and, at the same time, of the actual choices which are acceptable.

Referring to FIG. 6, the user selects the baud rate at 410, the parity setting at 412, the Data Bits at 414, the stop bits at 416, and a log file name 417 to store the data transactions.

Returning to FIG. 5, upon completion of the selection of the parameters of the Port, the user can, at 418, elect to begin session, (a first choice), end session (a second choice), or return to the main menu for other major choices by selecting not to begin a session if one has not yet been started. It is obvious that if a session has not been started it cannot be ended. In the embodiment illustrated the choices available are, at 420, File Editing; at 422, File Printing; at 424, File data filter; at 426, File data cruncher; at 428, Binary to Hexadecimal Decoder; at 430, File Syntax Checker; and, at 432, Command File Transmitter.

The general check algorithm for selecting the major choices available at 420 through 432 are illustrated in FIG. 7. The selection process is started at 434. An initial selection is made at 436 and examined for validity at 438. If the selection is not valid, an error message appears on the screen and, with the aid of a prompt, a valid selection can be made. Thereafter, at 440, an opportunity is provided to make a further selection. If a further selection is made, the process proceeds as noted above. If, however, no further selections are desired, than, at 442, the user is returned to the main menu.

Thus, the system is initiated by the presentation of a menu that provides the user with the major alternatives of setting system parameters or immediately ending the program. If the former is chosen, then the main menu permits selection of any of the major parameters available such as Baud Rate, Parity, Number of Data Bits, Number of Stop Bits, Logging Files, Time Stamping, Session beginning, Exit and the like.

Once one of the major choices has been made, sub menus appear to provide for the available sub-choices. For example, for the Baud Rate main choice, there can be eight sub-choices. The selection of any sub-choice is made by inserting the correct parameter (i.e. 9600, 1200, 4800, and the like) into the appropriate field provided. If an incorrect number is entered, it will not be accepted, and valid values will be displayed for selection. This procedure is used throughout the set up procedure, and is shown in FIG. 7.

After selection of a subchoice, the user is sent back to the main menu to continue the configuration procedure by choosing another main choice.

This procedure is continued until all major parameters have been configured, and a data log file has been named. A session is then initiated from the main menu. When desired, the initiate session can be concluded by pressing an appropriate key on the personal computer.

FIG. 8 is a memory map of that region of the hard disk 33 that holds the "permanent" copy of the facsimile catalog program, denoted 36, as previously discussed. As shown therein, the program includes a number of identifiable modules, copies of which comprise the executed copy of the program stored in RAM 38. The principal functions of these modules are as follows:

A) locations 722, 724, 726, 728, 732, 736, 738, 742, 744, 746, and 748 contain the execution instructions for implementing the decision and monitor functions;

B) locations 750, 760, 770, 780, 790, 792 and 794 contain the relocatable variables such as Baud, Parity, Data Bits, Stop Bits, Log File, Intermediate Storage, and Time Stamp; and C) location 740 is for the final storage of all data which is received/transmitted during a session.

The preceding merely illustrates the principles of the invention. For example, although the invention has been disclosed in the context of a particular hardware configuration, other hardware configurations providing the same functionality may be used. Although the presently disclosed system maintains the information acquired in local storage, it may be decided—particularly if there is a large volume of requestable information—to store that information on a larger system and have the local system, i.e., the system interacting with the line being monitored, request and have downloaded the information when it is needed.

It will thus be appreciated that those skilled in the art will be able to devise numerous arrangements which, although not explicitly shown or described herein, embody the principles of the invention and are within its spirit and scope.

What is claimed is:

1. Apparatus for monitoring the performance of a digital communications link interposed between at least a first end user at a first location and at least a second end user at a second location comprising, connect means interposed between said digital communications link and a PC to couple data signals from said digital communications link to said PC and to block the sending of acknowledgement signals from said PC of the data signals received from said digital communication link, a program resident on said PC for storing instructions for conditioning said PC to monitor communications exchanged between said first end user and said second end user, said connect means further comprising a first pin connector for coupling signals out of said digital communications link, a second pin connector for coupling signals into said PC, a first signal conducting path coupling pin numbers 1, 2 and 7 of said first pin connector to pin numbers 1, 3 and 7 respectively of said second pin connector, a first signal shorting path coupled to pin numbers 4 and 5 of said second pin connector and a second signal shorting path coupled to pin numbers 6, 8 and 20 of said second pin connector, a third pin connector for coupling signals into said digital communication link, a fourth pin connector for coupling signals out of said PC, a second signal conducting path coupling pin numbers 1, 3 and 7 of said third pin connector to pin numbers 1, 3 and 7 respectively of said fourth pin connector, a third signal shorting path coupled to pin numbers 4 and 5 of said fourth pin connector, and a fourth signal shorting path coupled to pin numbers 6, 8 and 20 of said fourth pin connector.

* * * * *

UNITED STATES PATENT AND TRADEMARK OFFICE
CERTIFICATE OF CORRECTION

PATENT NO. : 5,040,111

DATED : August 13, 1991

INVENTOR(S) : D. Y. Al-Salameh, J. J. Farah, J. Soukas

It is certified that error appears in the above-identified patent and that said Letters Patent is hereby corrected as shown below:

Title Page: Items [19] and [75]:

Please correct the spelling of the last name of the first inventor.
It is: Al-Salameh.

Signed and Sealed this

Eighth Day of December, 1992

Attest:

DOUGLAS B. COMER

*Attesting Officer*          *Acting Commissioner of Patents and Trademarks*